US011055091B2

(12) United States Patent
Sobran et al.

(10) Patent No.: US 11,055,091 B2
(45) Date of Patent: Jul. 6, 2021

(54) PROJECT ADOPTION DOCUMENTATION GENERATION USING MACHINE LEARNING

(71) Applicant: International Business Machines Corporation, Armonk, NY (US)

(72) Inventors: Alexander Sobran, Chapel Hill, NC (US); Bo Zhang, Cary, NC (US); Joseph Hughes, Durham, NC (US); John H. Walczyk, III, Raleigh, NC (US); Guilherme Ferreira, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/409,469

(22) Filed: May 10, 2019

(65) Prior Publication Data

US 2020/0356364 A1 Nov. 12, 2020

(51) Int. Cl.
*G06F 8/73* (2018.01)
*G06N 20/00* (2019.01)

(52) U.S. Cl.
CPC .............. *G06F 8/73* (2013.01); *G06N 20/00* (2019.01)

(58) Field of Classification Search
CPC ................................ G06Q 10/103; G06F 8/73
See application file for complete search history.

(56) References Cited

U.S. PATENT DOCUMENTS

| 8,983,855 | B1* | 3/2015 | Bombalier | G16H 10/60 |
| | | | | 705/2 |
| 2012/0016653 | A1 | 1/2012 | Bhandar et al. | |
| 2012/0226618 | A1* | 9/2012 | Kay | G06Q 10/06 |
| | | | | 705/301 |
| 2012/0278357 | A1 | 11/2012 | Creem et al. | |
| 2016/0171400 | A1* | 6/2016 | Bastide | G06Q 10/103 |
| | | | | 705/301 |
| 2016/0314417 | A1* | 10/2016 | Jayaraman | G06Q 10/0635 |
| 2017/0364850 | A1* | 12/2017 | Johnston | G06Q 10/06313 |
| 2018/0068271 | A1 | 3/2018 | Abebe et al. | |

(Continued)

OTHER PUBLICATIONS

Verena Honsel et al., "Developer Oriented and Quality Assurance Based Simulation of Software Processes", [Online], pp. 1-9, [Retrieved from Interneton Feb. 25, 2021], <http://ceur-ws.org/Vol-1820/paper-01.pdf>, (Year: 2015).*

(Continued)

*Primary Examiner* — Ziaul A Chowdhury
(74) *Attorney, Agent, or Firm* — Garg Law Firm, PLLC; Rakesh Garg; William Hartwell

(57) ABSTRACT

The present invention relates to a method, system, and computer program product for project adoption documentation generation using machine learning. A method includes receiving a set of project parameters for a set of projects. In an embodiment, a method includes receiving a set of input project parameters for an input project. In an embodiment, a method includes comparing each set of project parameters to the set of input project parameters. In an embodiment, a method includes selecting, responsive to the comparison, a project from the set of projects. In an embodiment, a method includes generating, responsive to the selection, documentation for the input project.

20 Claims, 6 Drawing Sheets

(56) References Cited

U.S. PATENT DOCUMENTS

2018/0136933 A1* 5/2018 Kogan .................. G06F 16/26

OTHER PUBLICATIONS

Anirban Das, "An Integrated Framework to Attain Transparency and Control While Managing Globally Distributed Projects", [Online], pp. 1-15, [Retrieved from Internet on Feb. 25, 2021], <http://citeseerx.ist.psu.edu/viewdoc/download?doi=10.1.1.106.8064&rep=rep1&type=pdf>.*

Martin Konopka et al., Poster: Discovering Code Dependencies by Harnessing Developer's Activity, [Online], pp. 1-2, [Retrieved from Interent on Feb. 25, 2021], <https://dl.acm.org/doi/pdf/10.5555/2819009.2819174>, (Year: 2015).*

James Aspnes et al., "Tight Bounds for Anonymous Adopt-Commit Objects", [Online], pp. 317-323, [Retrieved from Internet on Feb. 25, 2021], <https://dl.acm.org/doi/pdf/10.1145/1989493.1989548> (Year: 2011).*

Ürgen Münch, "Transformation-based Creation of Custom-tailored Software Process Models", Proceedings of the 5th Intl. Workshop, ProSim 2004, pp. 50-56, May 24-25, 2004.

\* cited by examiner

*FIGURE 3*

| PROJECT | DEPENDENCE 1 | DEPENDENCE 2 | DEPENDENCE 3 | DEPENDENCE 4 | DEPENDENCE 5 | ... | DEPENDENCE N | TOOL X |
|---|---|---|---|---|---|---|---|---|
| PROJECT 1 | C11 | C12 | NULL | C14 | C15 | ... | C1N | C1X |
| PROJECT 2 | C21 | NULL | C23 | NULL | NULL | ... | C2N | C2X |
| PROJECT 3 | C31 | C32 | C33 | NULL | C35 | ... | C3N | C3X |
| PROJECT 4 | C41 | C42 | C43 | C44 | C45 | ... | C4N | C4X |
| ... | ... | ... | ... | ... | ... | ... | ... | ... |
| PROJECT M | CM1 | CM2 | CM3 | CM4 | CM5 | ... | CMN | CMX |
| PROJECT Y | CY1 | CY2 | CY3 | NULL | CY5 | ... | CYN | CYX |

300

302

PROJECT ADOPTION DOCUMENTATION GENERATION USING MACHINE LEARNING

TECHNICAL FIELD

The present invention relates generally to a method, system, and computer program product for software documentation generation. More particularly, the present invention relates to a method, system, and computer program product for project adoption documentation generation using machine learning.

BACKGROUND

Software documentation is written text or illustration that accompanies computer software and explains the operation and use of the computer software. A documentation generator is a programming tool that generates software documentation for programmers and end users from a set of source code files. Documentation generators author software for creating training manuals, technical blog reviews, software workflow presentations, and step-by-step guides.

Application adoption and integration can be difficult due to a lack of sufficient personalized software documentation. Information is often missing, confusing, or incorrect. Developers often resort to blogs and websites to fill in necessary gaps.

SUMMARY

The illustrative embodiments provide a method, system, and computer program product. An embodiment includes a method including receiving a set of project parameters for a set of projects. In an embodiment, a method includes receiving a set of input project parameters for an input project. In an embodiment, a method includes comparing each set of project parameters to the set of input project parameters. In an embodiment, a method includes selecting, responsive to the comparison, a project from the set of projects. In an embodiment, a method includes generating, responsive to the selection, documentation for the input project.

In an embodiment, a method includes determining a first commit before adoption of a first project in the set of projects. In an embodiment, a method includes determining a second commit after adoption of the first project. In an embodiment, a method includes determining a first set of dependencies between the first commit and the second commit.

In an embodiment, a method includes determining a second set of dependencies for a second project. In an embodiment, a method includes determining a third set of dependencies for the input project. In an embodiment, a method includes comparing the third set of dependencies to each of the first set of dependencies and the second set of dependencies.

In an embodiment, a method includes selecting, in response to the dependency comparison, the first project in the set of projects. In an embodiment, a method includes comparing the first commit and the second commit. In an embodiment, a method includes generating, in response to the commit comparison, software documentation from the first project, the software documentation indicating a difference between the first commit and the second commit.

In an embodiment, the set of project parameters includes a programming language. In an embodiment, the set of project parameters includes a set of file sizes. In an embodiment, the set of project parameters includes a set of dependencies. In an embodiment, the set of project parameters includes an adoption time. In an embodiment, the set of project parameters includes a complexity of program code. In an embodiment, the set of project parameters includes a set of commits.

In an embodiment, the program instructions are stored in a computer readable storage device in a data processing system, and wherein the program instructions are transferred over a network from a remote data processing system.

In an embodiment, the program instructions are stored in a computer readable storage device in a server data processing system, and wherein the program instructions are downloaded over a network to a remote data processing system for use in a computer readable storage device associated with the remote data processing system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for dependency analysis in accordance with an illustrative embodiment;

DETAILED DESCRIPTION

The illustrative embodiments are described with respect to certain types of programming languages, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
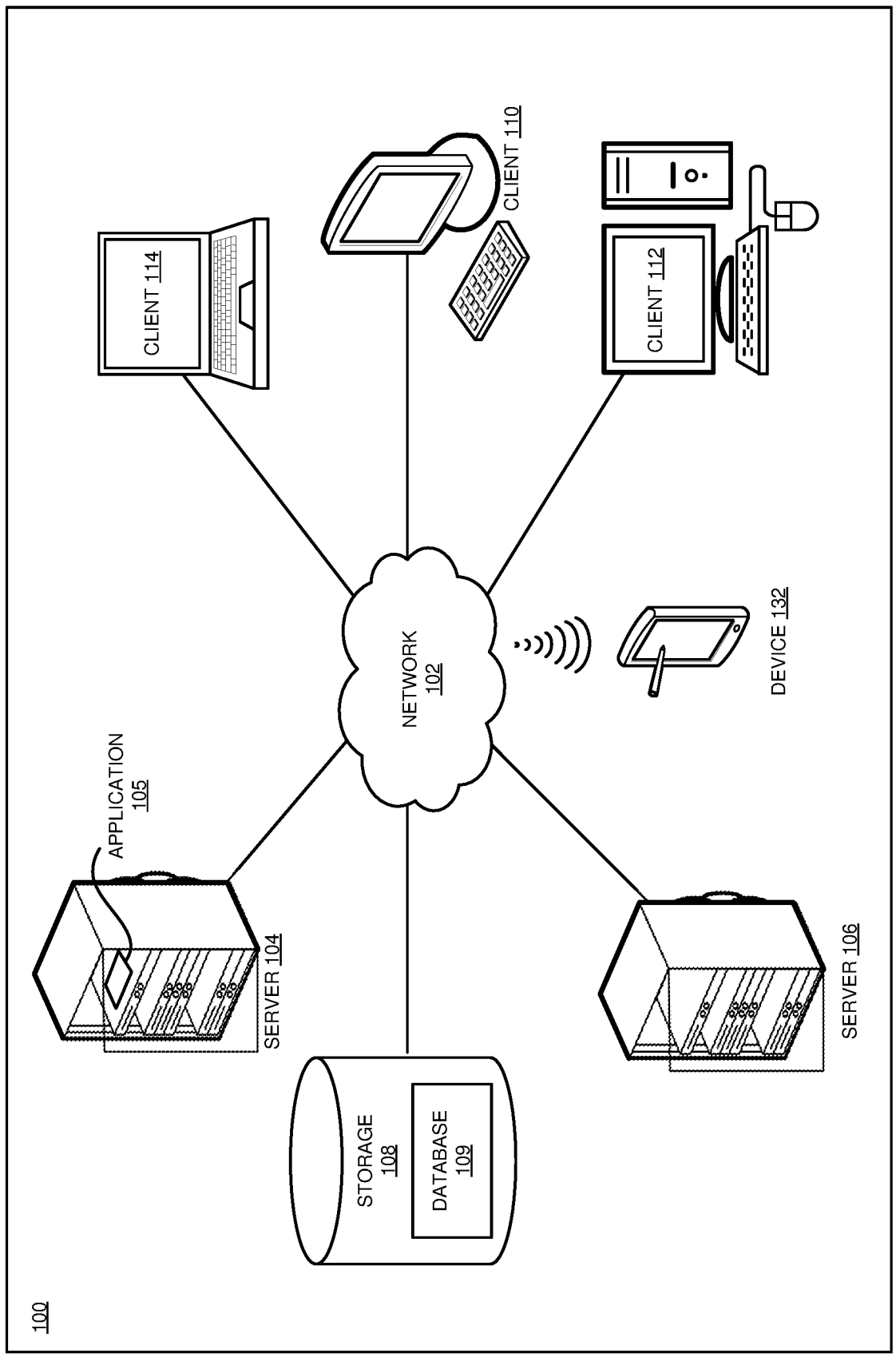
FIG. 1 depicts a block diagram of a network of data processing systems in which illustrative embodiments may be implemented.
Figure 2:
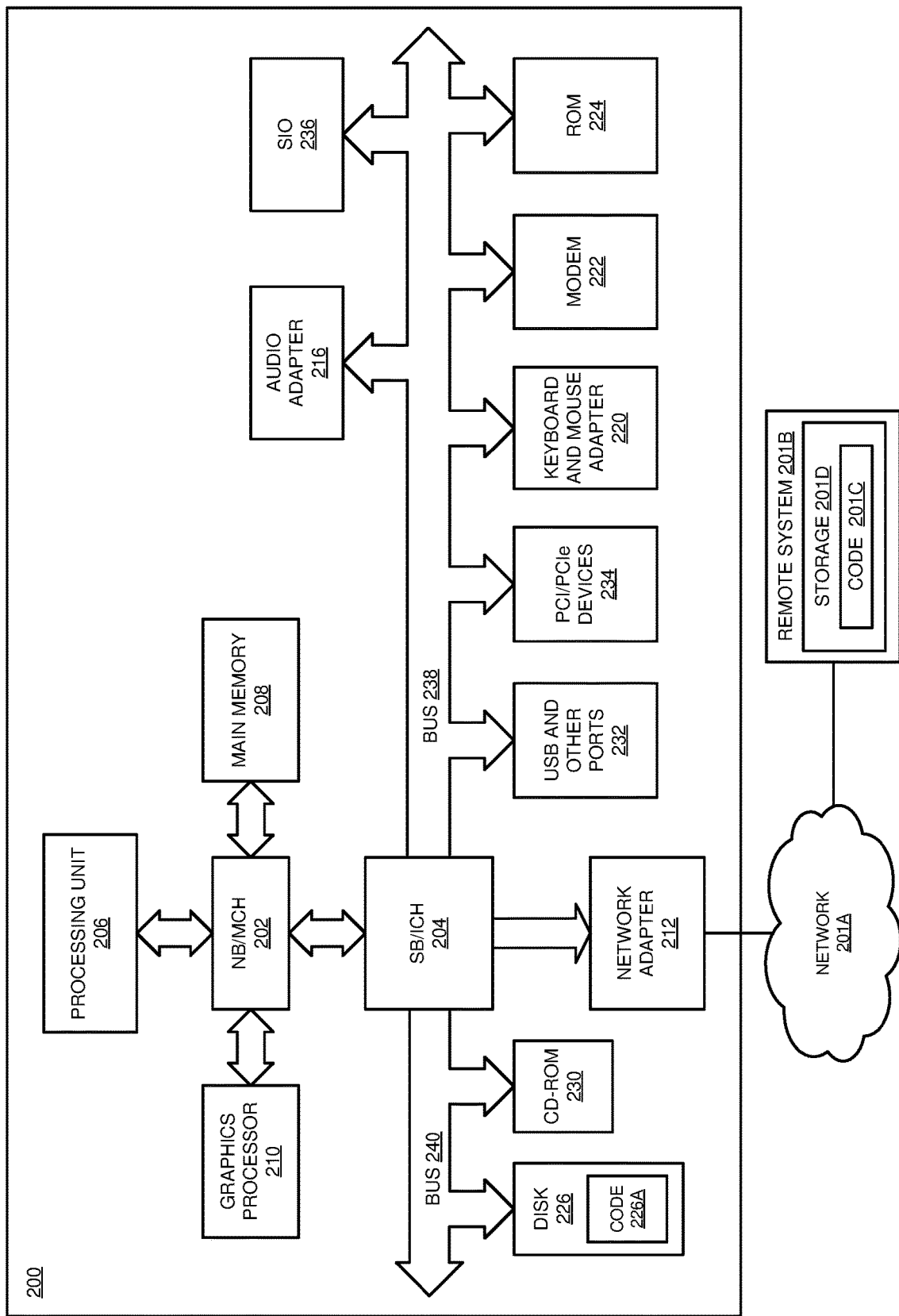
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for dependency analysis in accordance with an illustrative embodiment. Configuration 300 includes table 302 for a set of projects and a set of corresponding dependencies.

Dependency management software tracks the set of dependencies for a current project. Table 302 includes a set of previous Projects 1 through M and the corresponding dependencies. Project Y is a current project intended to be adopted. Project 1 includes dependencies 1, 2, 4, 5, and N. Project 1 lacks dependency 3. Likewise, projects 2 through M include certain dependencies and lack other dependencies. Project Y includes the same dependencies as Project 3 and lacks the same dependencies as Project 3. Application 105 in FIG. 1 compares the previous projects to determine a similarity with the current project, Project Y. For example, application 105 can determine Project 3 is most similar to Project Y due to the shared dependencies.

Figure 4:
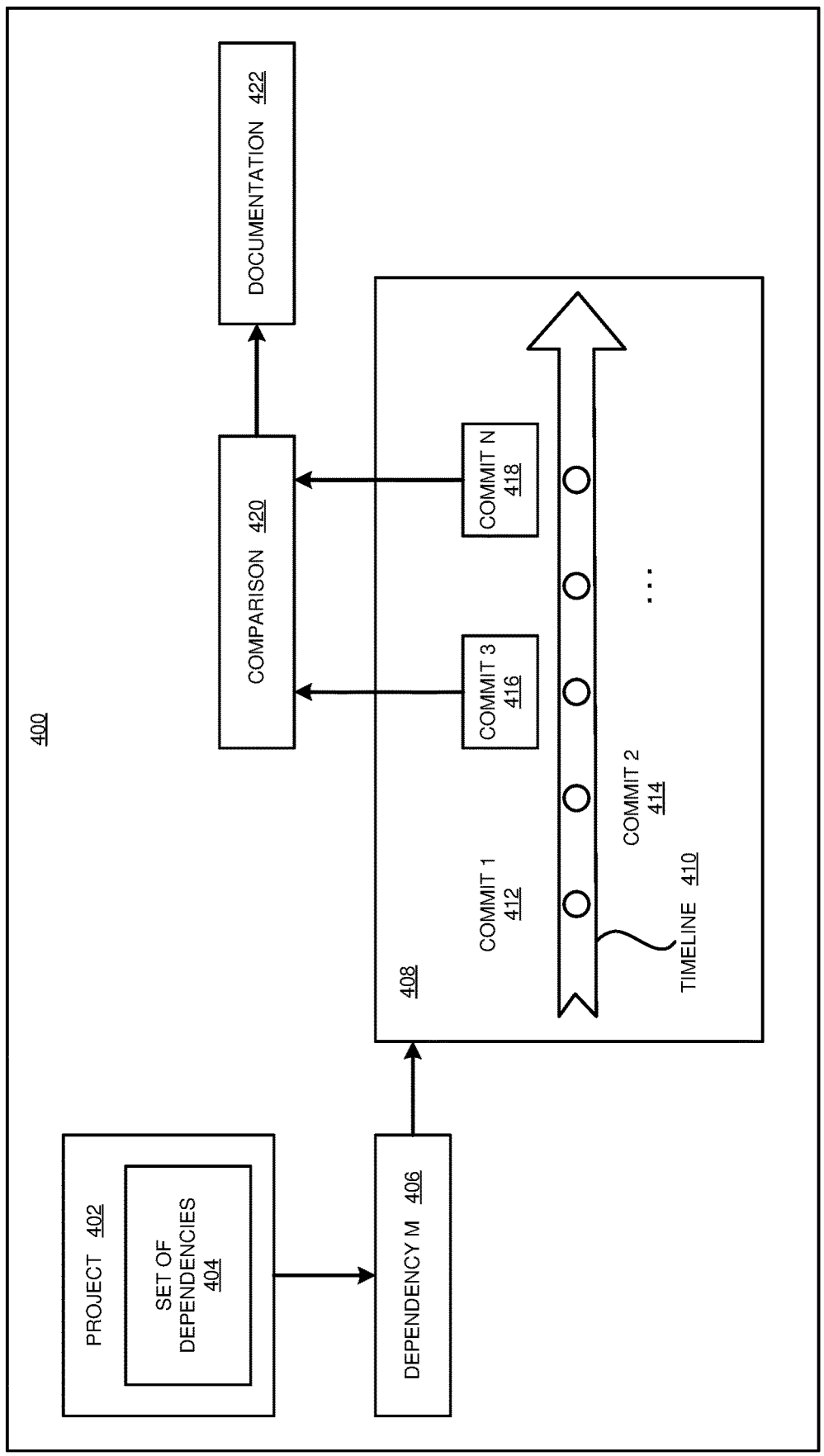
FIG. 4 depicts a block diagram of an example configuration for projection adoption documentation generation using machine learning in accordance with an illustrative embodiment.

With reference to FIG. 4, this figure depicts a block diagram of an example configuration for projection adoption documentation generation using machine learning in accordance with an illustrative embodiment. Configuration 400 includes project 402. Project 402 includes a set of dependencies 404. The set of dependencies 404 includes dependency M 406.

Application 105 in FIG. 1 examines a project repository for project 402. Application 105 examines timeline 410 in the project repository which represents a history of commits in the adoption of project 402. Timeline 410 includes commits 412, 414, 416, and 418. Application 105 determines commit 416 occurs immediately before adoption of project 402. Application 105 determines commit 418 occurs immediately upon completion of adoption of project 402.

Application 105 extracts a set of information from each of commit 416 and commit 418 based on the determinations. Application 105 performs a comparison 420 between the commit 416 and commit 418.

Figure 5:
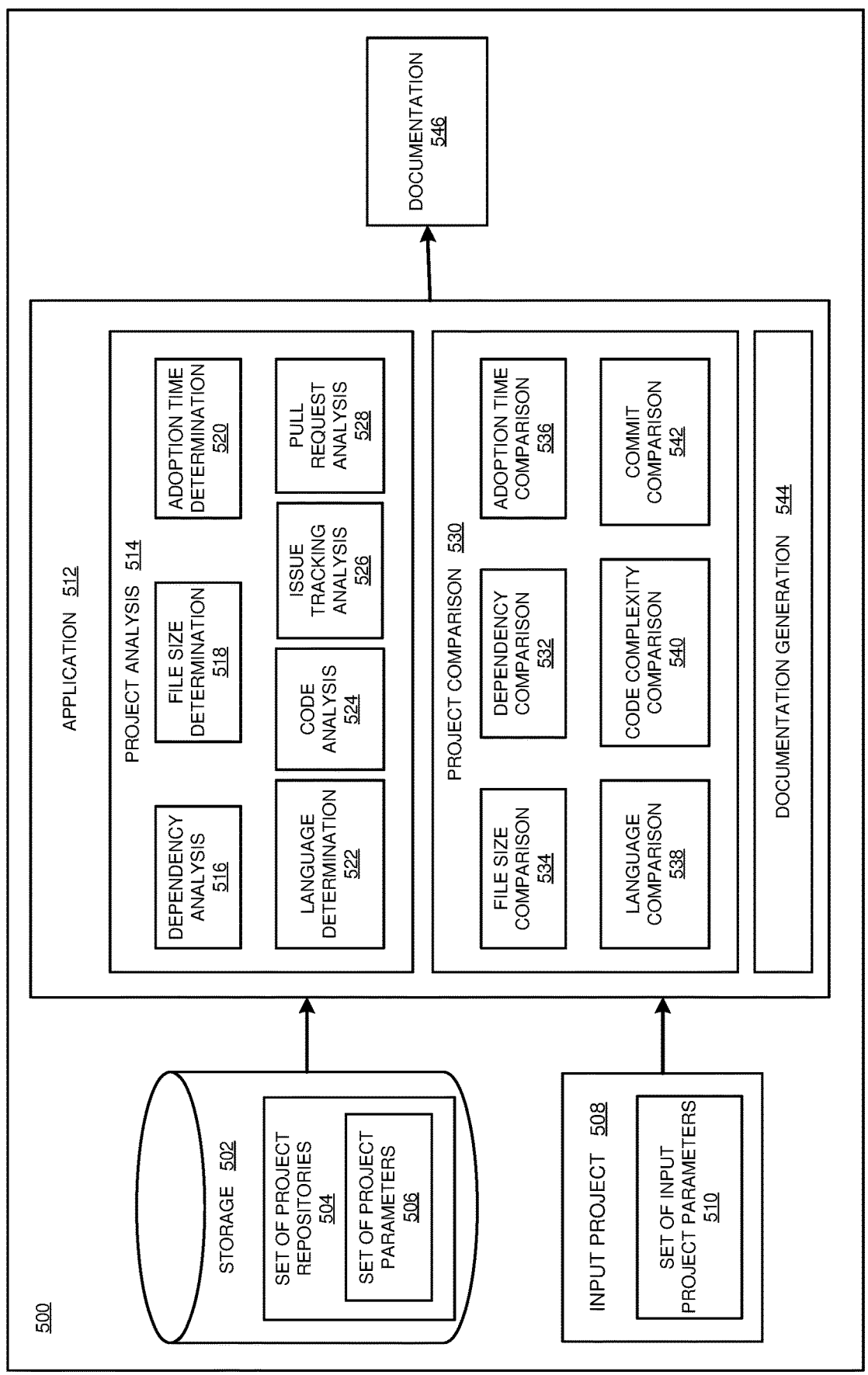
FIG. 5 depicts a block diagram of an example configuration for project adoption documentation generation using machine learning in accordance with an illustrative embodiment.

With reference to FIG. 5, this figure depicts a block diagram of an example configuration for project adoption documentation generation using machine learning in accordance with an illustrative embodiment. Configuration 500 includes storage 502 and application 512. Storage 502 is an example of storage 108 in FIG. 1. Application 512 is an example application 105 in FIG. 1.

Storage 502 includes a set of project repositories 504. Each project repository includes a set of project parameters 506. In an embodiment, each of the set of project parameters 506 includes a set of commits, a set of source code, a programming language in which the project is written, a set of build steps, a set of deploy steps, a set of architectural documents, a number of team members, a size of files in the project repository, an install base, a time to adopt the project, and any other items stored in the project repository.

Application 512 receives a set of input project parameters 510. In an embodiment, the set of input project parameters 510 includes a set of commits, a set of source code, a programming language in which the project is written, a set of build steps, a set of deploy steps, a set of architectural documents, a number of team members, a size of files in the project repository, an install base, a time to adopt the project, and any other items stored in the project repository.

Application 512 includes project analysis component 514, project comparison component 530, and documentation generation component 544. Project analysis component 514 examines the set of input project parameters 510 and the set of project parameters 506. In an embodiment, project analysis component 514 retrieves issue tracking data.

In an embodiment, project analysis component 514 determines when an issue indicating adoption of a project is resolved. In an embodiment, project analysis component 514 determines a first commit before project adoption and a second commit after project adoption indicating resolution of the adoption issue. In an embodiment, project analysis component 514 examines a project repository for a pull request indicating adoption of a project. In an embodiment, project analysis component 514 examines a reference in a body of the pull request. In an embodiment, project analysis component 514 marks a first commit before project adoption as a fork commit. In an embodiment, project analysis component 514 marks a second commit after project adoption as a merge commit.

Dependency analysis component 516 determines a set of dependencies for each of the projects in the set of project parameters 506. In an embodiment, file size determination component 518 determines a set of file sizes for a set of files for each project. In an embodiment, adoption time determination component 520 determines an adoption time for each project in the set of project repositories 504. For example, component 520 determines a time between a first commit before adoption indicating beginning of an adoption issue and a second commit after projection adoption indicating resolution of the adoption issue.

In an embodiment, language determination component 522 determines a programming language for each project in the set of project repositories 504. For example, component 522 can determine a project is written in python programming language, java programming language, or any other suitable programming language. In an embodiment, code analysis component 524 determines a level of complexity for a set of program code for each project in the set of project repositories 504. For example, component 524 determines a number of lines for each set of program code. In an embodiment, component 524 orders the sets of program code in order of increasing complexity by sorting from the lowest to the highest number of lines.

In an embodiment, issue tracking analysis component 526 retrieves a set of issue tracking data for each project in the set of project repositories 504. In an embodiment, component 526 determines when an issue indicating adoption of a project is resolved. In an embodiment, component 526 determines a first commit before project adoption and a second commit after project adoption indicating resolution of the adoption issue.

File size comparison component 534 compares a set of file sizes for each project in the set of project repositories 504 to a set of file sizes for the input project 508. In an embodiment, dependency comparison component 532 compares a set of dependencies for each project in the set of project repositories 504 to a set of dependencies for the input project 508. For example, component 532 can compare the existing dependencies, a lack of dependencies, or some combination for the input project 508 and the set of projects in the set of project repositories 504.

In an embodiment, adoption time comparison component 536 compares an adoption time for each project in the set of project repositories 504. For example, component 536 can order the set of projects according to an amount of adoption time for each project. In an embodiment, language comparison component 538 compares a programming language for each project in the set of project repositories 504 to a programming language of the input project 508. For example, component 538 can select a project from the set of project repositories 504 using the same programming language as the input project 508. In an embodiment, component 538 eliminates a subset of the set of projects from a selection list in response to having a programming language which differs from the input project 508.

In an embodiment, code complexity comparison component 540 compares a complexity of the programming code for each project to a complexity of the programming code for the input project 508. For example, component 540 can compare a number of lines for each project in the set of project repositories 504 to a number of lines for the input project 508. In an embodiment, project comparison component 530 selects a similar project from the set of project repositories 504 based on the comparisons described herein. In an embodiment, commit comparison component 542 compares a first commit and a second commit from a selected similar project. In an embodiment, documentation generation component 544 creates software documentation 546 based on the comparison.

Figure 6:
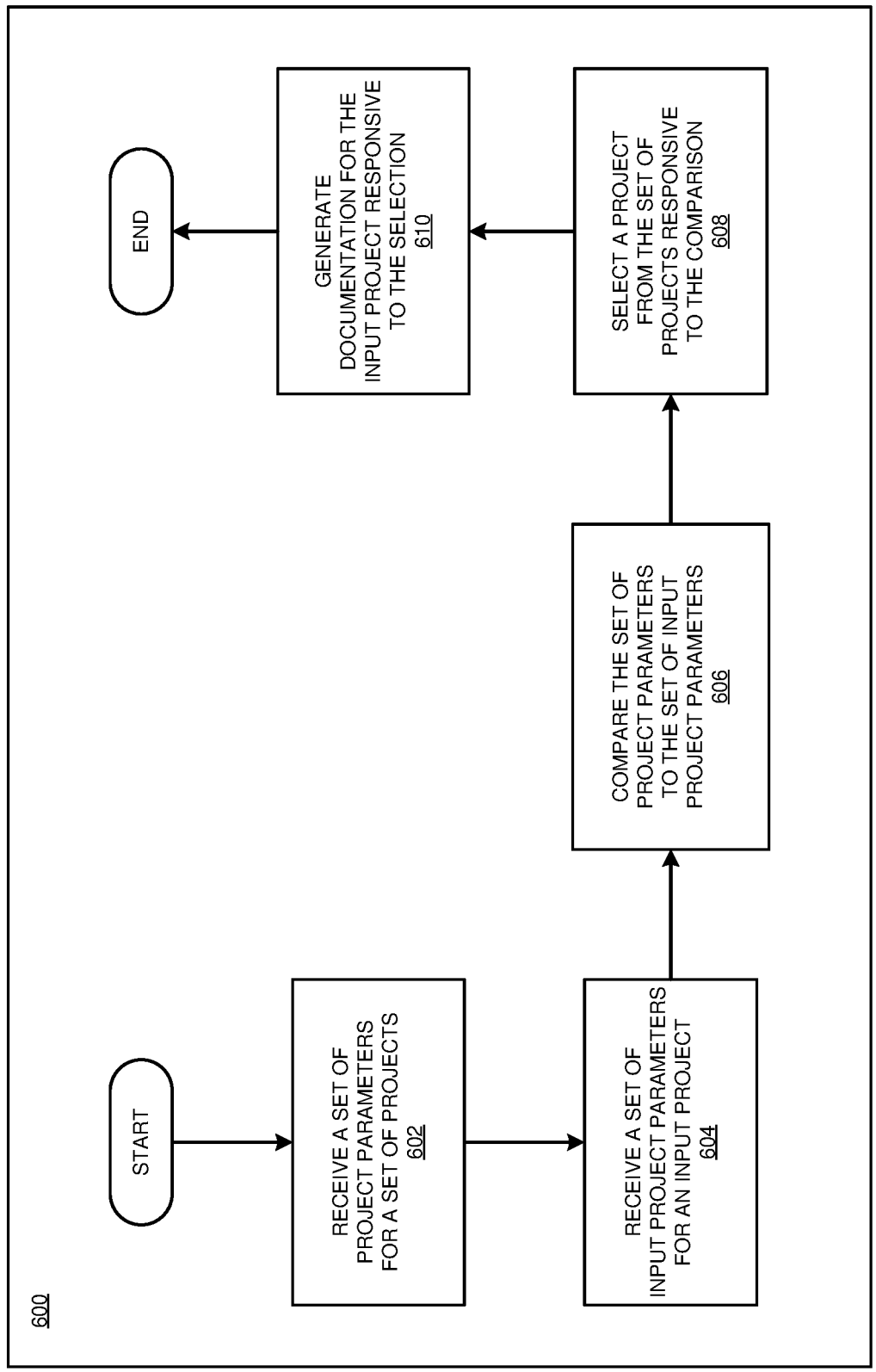
FIG. 6 depicts a flowchart of an example process for project adoption documentation generation using machine learning in accordance with an illustrative embodiment.

With reference to FIG. 6, this figure depicts a flowchart of an example process for project adoption documentation generation using machine learning in accordance with an illustrative embodiment. Process 600 can be implemented in application 105 in FIG. 1.

In block 602, the application receives a set of project parameters for a set of projects. In block 604, the application receives a set of input project parameters for an input project. In block 606, the application compares the set of project parameters to the set of input project parameters. In block 608, the application selects a project from the set of projects responsive to the comparison. In block 610, the application generates documentation for the input project responsive to the selection. Process 600 ends thereafter. In an illustrative embodiment, the process incudes creating custom documentation for a current or input project 508(e.g. PROJECT Y of FIG. 3) that wants to adopt a target tool (e.g. TOOL X of FIG. 3). The process includes mining a pool of previous projects repositories and issue tracking systems that have adopted the target tool (e.g. PROJECT 1-M of FIG. 3) and selecting for the current project (e.g. PROJECT Y of FIG. 3) a similar project from the pool of previous project repositories or issue tracking systems using their dependencies (e.g. selecting PROJECT 3 of FIG. 3 as it is most similar to Project Y due to the shared dependencies). The selecting is done by generating, for each project in the pool of previous projects repositories and issue tracking systems a commit before said adoption of "TOOL X" and a commit after said adoption of "TOOL X" as explained earlier and computing a difference between the commit before target tool adoption and the commit after target tool adoption. The difference can be presented as the custom documentation.

Thus, a computer implemented method, system or apparatus, and computer program product are provided in the illustrative embodiments for cross-subject model-generated training data for relation extraction modeling and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of creating documentation for an input project comprising:
    receiving a set of project parameters corresponding to a set of projects, wherein the set of projects are part of a pool of previous project repositories and issue tracking systems and have undergone adoption;
    receiving a set of input project parameters for an input project that is to undergo adoption;
    selecting for the input project a similar project from the set of projects using shared dependencies by:
        determining, for each project in the set of projects, a commit before adoption of said each project and a commit after adoption of said each project and ordering the set of projects according to an amount of adoption time for each project;
    generating for the selected project a difference between the commit before adoption of the selected project and the commit after adoption of the selected project; and
    presenting the difference as the documentation,
    wherein the commit before adoption of said each project and the commit after adoption of said each project are each determined to indicate resolution of an adoption issue, wherein a project analysis component examines a reference in a body of a corresponding pull request, and wherein the method further comprises: responsive to determining a pull request indicating project adoption, marking the commit before adoption of said each project as a fork commit and marking the commit after adoption of said each project as a merge commit.

2. The method of claim 1, wherein each project in the set of projects has undergone adoption at different time points, and wherein the set of project parameters includes an adoption.

3. The method of claim 1, wherein the set of project parameters includes a programming language.

4. The method of claim 1, wherein the set of project parameters includes a set of file sizes.

5. The method of claim 1, wherein the set of project parameters includes a set of dependencies.

6. The method of claim 1, wherein the set of project parameters includes a complexity of program code.

7. The method of claim 1, wherein the set of project parameters includes a set of commits.

8. A computer usable program product comprising one or more computer-readable storage devices, and program instructions stored on at least one of the one or more storage devices, the stored program instructions comprising:
    program instructions to receive a set of project parameters corresponding to a set of projects, wherein the set of projects are part of a pool of previous project repositories and issue tracking systems and have undergone adoption;

program instructions to receive a set of input project parameters for an input project that is to undergo adoption;

program instructions to select for the input project a similar project from the set of projects using shared dependencies by:

determining, for each project in the set of projects, a commit before adoption of said each project and a commit after adoption of said each project and ordering the set of projects according to an amount of adoption time for each project;

program instructions to generate for the selected project a difference between the commit before adoption of the selected project and the commit after adoption of the selected project;

program instructions to present the difference as the documentation; and program instructions to determine the commit before adoption of said each project and the commit after adoption of said each project to indicate resolution of an adoption issue, wherein a project analysis component examines a reference in a body of a corresponding pull request, and wherein the method further comprises: responsive to determining a pull request indicating project adoption, marking the commit before adoption of said each project as a fork commit and marking the commit after adoption of said each project as a merge commit.

9. The computer usable program product of claim 8, wherein each projects in the set of project has undergone adoption at different time points, and wherein the set of project parameters includes an adoption time.

10. The computer usable program product of claim 8, wherein the set of project parameters includes a programming language.

11. The computer usable program product of claim 8, wherein the program instructions are stored in a computer readable storage device in a data processing system, and wherein the program instructions are transferred over a network from a remote data processing system.

12. The computer usable program product of claim 8, wherein the program instructions is stored in a computer readable storage device in a server data processing system, and wherein the program instructions is downloaded over a network to a remote data processing system for use in a computer readable storage device associated with the remote data processing system.

13. The computer usable program product of claim 8, wherein the set of project parameters includes a set of file sizes.

14. The computer usable program product of claim 8, wherein the set of project parameters includes a set of dependencies.

15. The computer usable program product of claim 8, wherein the set of project parameters includes a complexity of program code.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive a set of project parameters tar corresponding to a set of projects, wherein the set of projects are part of a pool of previous project repositories and issue tracking systems and have undergone adoption;

program instructions to receive a set of input project parameters for an input project that is to undergo adoption;

program instructions to select for the input project a similar project from the set of projects using shared dependencies by:

determining, for each project in the set of projects, a commit before adoption of said each project and a commit after adoption of said each project and ordering the set of projects according to an amount of adoption time for each project;

program instructions to generate for the selected project a difference between the commit before adoption of the selected project and the commit after adoption of the selected project;

program instructions to present the difference as the documentation; and program instructions to determine the commit before adoption of said each project and the commit after adoption of said each project to indicate resolution of an adoption issue, wherein a project analysis component examines a reference in a body of a corresponding pull request, and wherein the method further comprises: responsive to determining a pull request indicating project adoption, marking the commit before adoption of said each project as a fork commit and marking the commit after adoption of said each project as a merge commit.

17. The computer system of claim 16, wherein each project in the set of projects has undergone adoption at different time points, and wherein the set of project parameters includes an adoption.

18. The computer system of claim 16, wherein the set of project parameters includes a programming language.

19. The computer system of claim 16, wherein the set of project parameters includes a set of file sizes.

20. The computer system of claim 16, wherein the set of project parameters includes a complexity of program code.

* * * * *